United States Patent [19]

Shaddock

[11] 4,227,893
[45] Oct. 14, 1980

[54] MOBILE VACUUM LOADER

[75] Inventor: Roland E. Shaddock, Streator, Ill.

[73] Assignee: Peabody-Myers Corporation, Streator, Ill.

[21] Appl. No.: 939,054

[22] Filed: Sep. 1, 1978

[51] Int. Cl.³ .................. B01D 35/12; B01D 37/00; B01D 50/00
[52] U.S. Cl. ........................................ 55/97; 15/340; 55/1; 55/314; 55/315; 55/319; 55/324; 55/341 R; 55/343; 55/344; 55/350; 55/356; 55/359; 55/385 B; 55/418; 55/430; 55/432; 55/472
[58] Field of Search .............. 55/97, 216, 1, 312, 55/319, 314–315, 309, 324, 321–322, 327, 334, 337, 343, 356, 359, 385 B, 418–419, 478, 341 R, 344, 350, 430, 432, 472; 15/331, 334, 337, 340, 347, 352–353

[56] References Cited

U.S. PATENT DOCUMENTS

| | | | |
|---|---|---|---|
| 2,867,231 | 1/1959 | Gerstmann | 15/353 UX |
| 3,052,908 | 9/1962 | Daneman | 15/340 |
| 3,166,393 | 1/1965 | Stevens | 55/419 X |
| 3,242,521 | 3/1966 | Young | 15/352 X |
| 3,404,776 | 10/1968 | Shaddock | 55/314 X |
| 3,842,461 | 10/1974 | Wurster | 15/326 |
| 3,870,489 | 3/1975 | Shaddock | 55/356 X |
| 3,885,932 | 5/1975 | Moore, Jr. et al. | 55/314 |
| 4,007,026 | 2/1977 | Groh | 55/356 X |
| 4,062,664 | 12/1977 | Dupre et al. | 55/319 |
| 4,111,670 | 9/1978 | DeMarco | 55/356 X |

FOREIGN PATENT DOCUMENTS 934293 8/1963 United Kingdom ............... 55/337

OTHER PUBLICATIONS

"Model 700 Industrial VACTOR." Myers-Sherman Co., Streator, Ill.

Primary Examiner—Kathleen J. Prunner
Attorney, Agent, or Firm—Hill, Van Santen, Steadman, Chiara & Simpson

[57] ABSTRACT

An industrial loader vehicle, handling both wet and dry materials, has a single engine driving the vehicle to a pick-up site, powering all of the components to load the vehicle at the site, driving the vehicle to an unloading site and dumping the materials as desired at the unloading site. A powerful blower develops a high velocity air stream through a pick-up inlet conduit and a collector chamber tiltable on the vehicle for easy dumping of the collected material. A swingable and tiltable boom mounted on top of the collector presents the conduit for easy access to material located around and above the vehicle. The high velocity air stream sweeps the material through the conduit into the top of the collector chamber where it drops to the bottom of the chamber. The blower and surrounding environment are protected from materials entrained in the air stream by bag filters and cyclone separators mounted on the front end of the collector to tilt therewith. The air outlet of the cyclone separator communicates with the blower through a self-sealing coupling and if desired a micro-filter may be interposed between this coupling and the blower. Gates accessible from the outside of the collector selectively direct the exiting air to the bag filters and cyclone separators for dry pick-up or to the cyclone separator for wet pick-up. The air received by the blower and discharged to the environment is thus freed from particulate matter. The vehicle is especially useful as a vacuum cleaner for debris to be transported to a dump.

37 Claims, 15 Drawing Figures

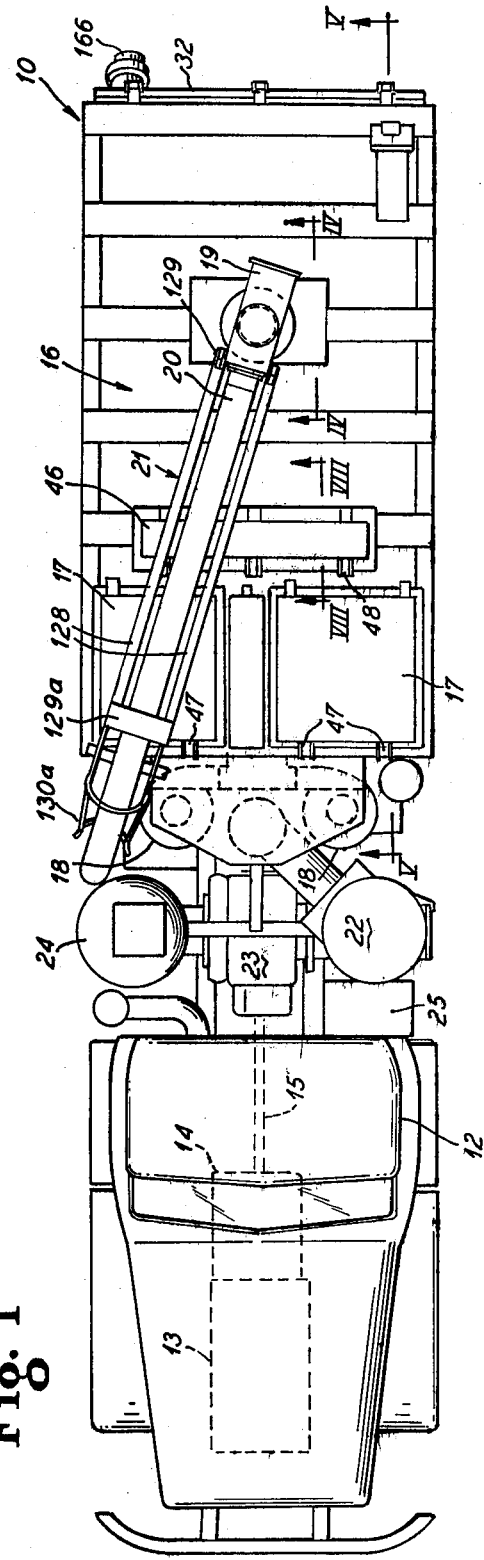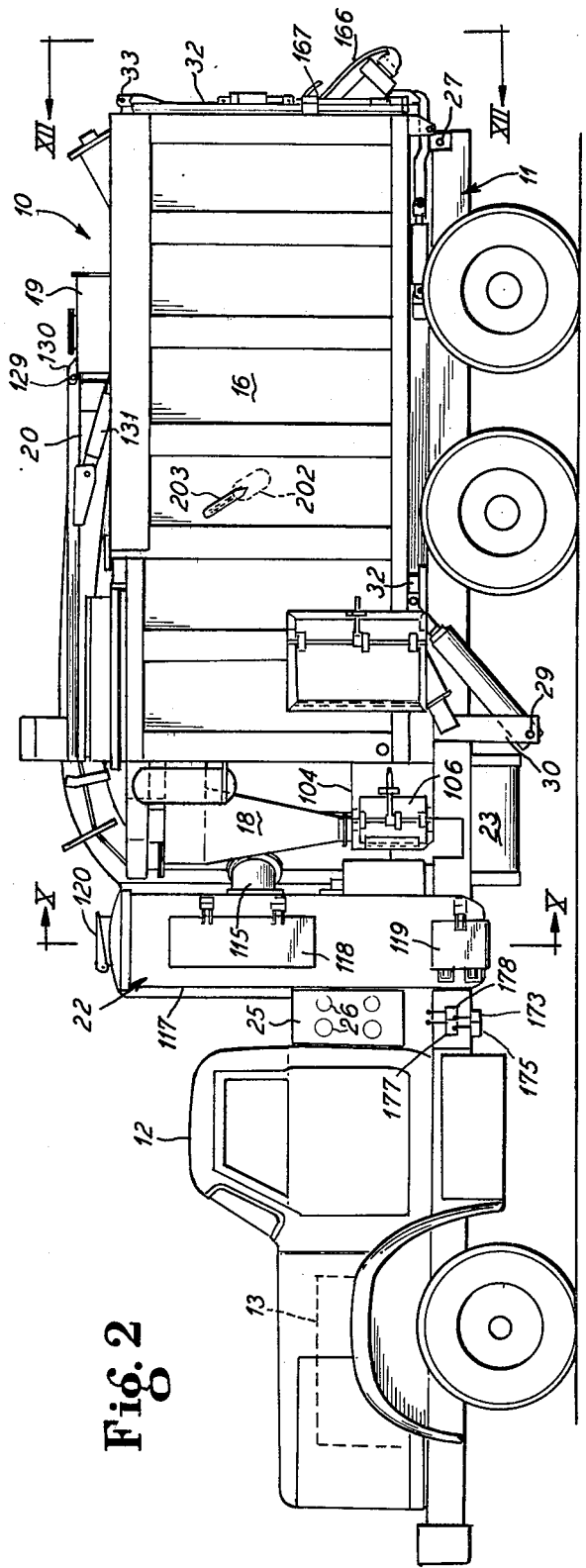
Fig. 1
Fig. 2

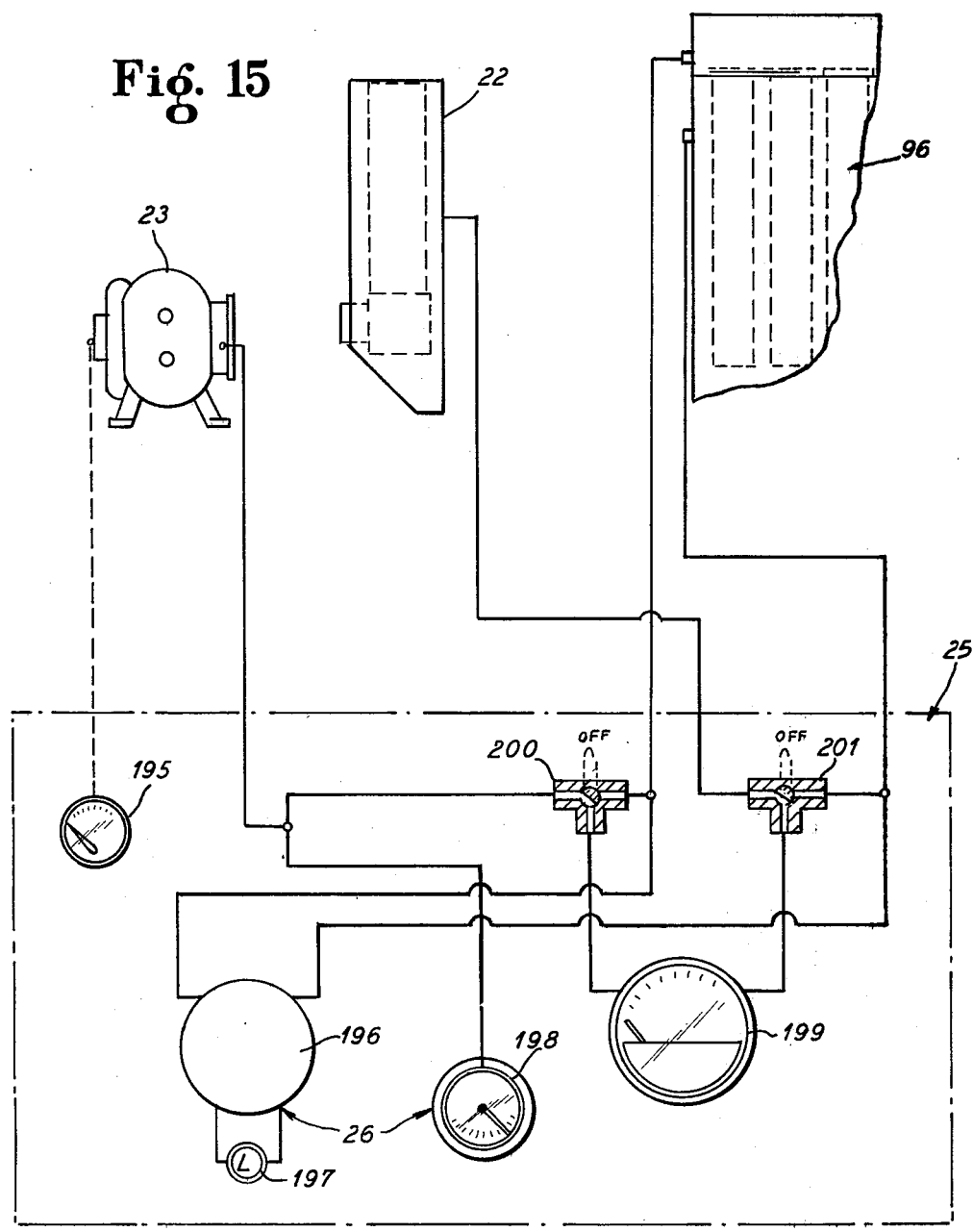

MOBILE VACUUM LOADER

BACKGROUND OF THE INVENTION

1. Field of the Invention

This invention relates to the art of vacuum loading mobile vehicles without discharging particulate matter to the environment. The invention is particularly concerned with a truck mounted industrial vacuum cleaner driven to a pick-up site, having a blower developing a high velocity air stream sweeping debris into a debris box on the truck for collection therein to be transported to a dump site, and having at least two different types of separators removing solids entrained in the air stream before they reach the blower and environment with externally accessible controls on the debris box selectively directing the air stream to the several separators to accommodate dry and wet debris.

2. Description of the Prior Art

Heretofore mobile vacuum loaders were equipped with bag filters which could not effectively handle wet debris especially under freezing conditions. Attempts to provide fine and coarse filters in series with a bypass control around the fine filter when wet debris was being handled required internal access to the debris box and prevented changeovers during operation at a pick-up site after the debris box is partially filled. A single filter bag house was fixedly mounted on the chassis of the vehicle with internal ducts from two separate inlets communicating with the debris box directing the air stream through first and second sets of bag filters or bypassing the first set when wet debris was being handled giving rise to clogging of air flow through the housing with wet debris especially under freezing conditions.

SUMMARY OF THIS INVENTION

This invention now provides a mobile vacuum loader which does not have the deficiencies of the prior art and is capable of handling dry and wet debris without polluting the environment or damaging equipment.

According to this invention there is provided a truck mounted industrial vacuum cleaner driven by a single engine to a pick-up site and then operated at the site by this engine to sweep materials to be removed from the site. While the vacuum cleaner is especially useful in cleaning up debris in industrial plants it is also useful for rapidly picking up materials at one site and transporting them to be discharged for use at another location. The invention will be specifically hereinafter described as a vacuum cleaner for picking up debris but it will be understood that the vacuum cleaner vehicles of this invention are generally useful as loaders and transporting units.

An important feature of this invention is the provision of a power take-off from a conventional truck engine to drive a high speed powerful Roots type rotary piston positive displacement blower for developing a high velocity air stream and for powering auxiliary equipment such as hydraulic jacks, and conveyors so that no additional prime movers are needed.

A further feature of the invention is the protection of the Roots blower and environment from pollutants in the air stream by different types of separators best suited for removal of the different types of pollutants that might be encountered.

A still further feature of this invention is the provision of externally accessible controls converting the loader for the handling of dry or wet materials without opening the collecting container.

Another feature of the invention is the provision of a tiltable debris box or collector carrying therewith two different types of separators and a conveyor removing separated material back to the debris box.

Another feature of the invention is the provision of a swinging tailgate selectively closing the entire rear end of the debris box with a latching mechanism insuring a sealing of the gate when closed.

A further feature of this invention is the provision of a tiltable and swingable boom on top of the debris box which presents the pick-up conduit to any location around and above the truck so that the debris will be discharged downwardly into the top of the debris box in all locations of the pick-up conduit.

Other and further objects and features of this invention will become apparent to those skilled in this art from the following detailed descriptions of a preferred embodiment of the invention shown on the accompanying drawings in which:

FIG. 1 is a top plan view of the mobile vacuum loader of this invention in its closed operating position.

FIG. 2 is a side elevational view of the loader of FIG. 1.

FIG. 15 is a diagram of a check panel indicating the operating conditions of the illustrated components.

As shown on the drawings:

GENERAL DESCRIPTION

Figure 3:
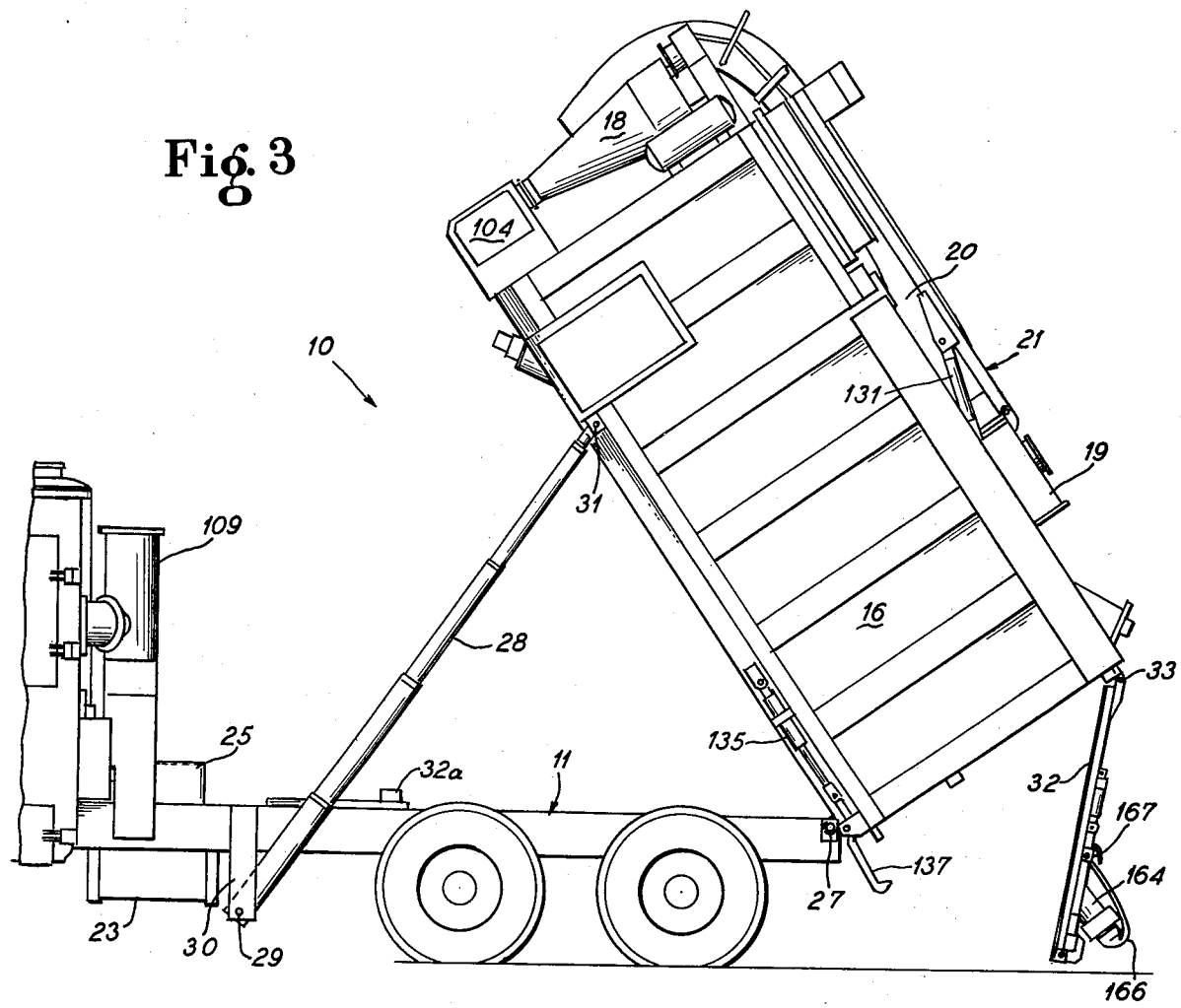
FIG. 3 is a fragmentary side elevational view of the loader of FIGS. 1 and 2 with the debris box in open dump position.

The loader 10 shown in FIGS. 1 to 3 includes a front and rear wheel supported truck chassis 11 with a front driver's cab 12, a prime mover engine 13, a transmission 14, and a drive shaft 15 driving the rear wheels through a differential as is customary in the art.

A dump type debris box 16 is tiltably mounted on the chassis 11 in spaced relation behind the cab 12. Doors 17,17 on top of the box 16 give access to a bag filter or separator compartment in the front (driver's cab 12) end of the debris box 16 and cyclone separators 18, 18 are mounted on the front end of the box.

An inlet 19 is provided on top of the box rearwardly from the doors 17 and a flexible tubular debris pick-up conduit or hose 20 supported in a rotatable and tiltable boom 21 overlying the debris box discharges into this inlet.

A micro-filter 22 is vertically mounted on the chassis in front of the cyclone separators 18,18 to receive air therefrom. A Roots blower 23 mounted on the chassis receives air from the micro-filter 22 and discharges through a muffler 24, also mounted on the chassis, to the atmosphere.

The general arrangement is such that the single truck engine 13 provides all of the power for driving the vehicle and operating the loader with the driven Roots blower creating the air stream which sweeps or pulls debris or other material to be loaded through the pick-up conduit 20 into the top inlet 19 of the debris box for depositing the material in the box and then exiting through filters and separators for discharge through the muffler to the atmosphere.

The vehicle is driven to the pick-up site, operated there to load the debris box 16 with either wet or dry material, and then driven to another location to dump the contents of the debris box.

An instrument panel 25 with gauges, lights and the like 26 is mounted on the chassis behind the cab 12 so that an operator can easily read the operating conditions and then monitor the operation of the components.

THE DEBRIS BOX

The collector or debris box 16 is air tight, rectangular in shape, fitting the chassis 11, and pivoted at its rear bottom end to the rear end of the chassis at 27 as shown in FIGS. 2 and 3.

A pair of hydraulic jacks 28 preferably of the type with extensible telescoped cylinders are pivotally anchored at 29 to brackets 30 depending from the chassis and each has its end cylinder pivoted at 31 to the floor of the box 16 near the forward end thereof. When the jacks 28 are retracted, the box 16 rests on a chassis support 32a.

Figure 12:
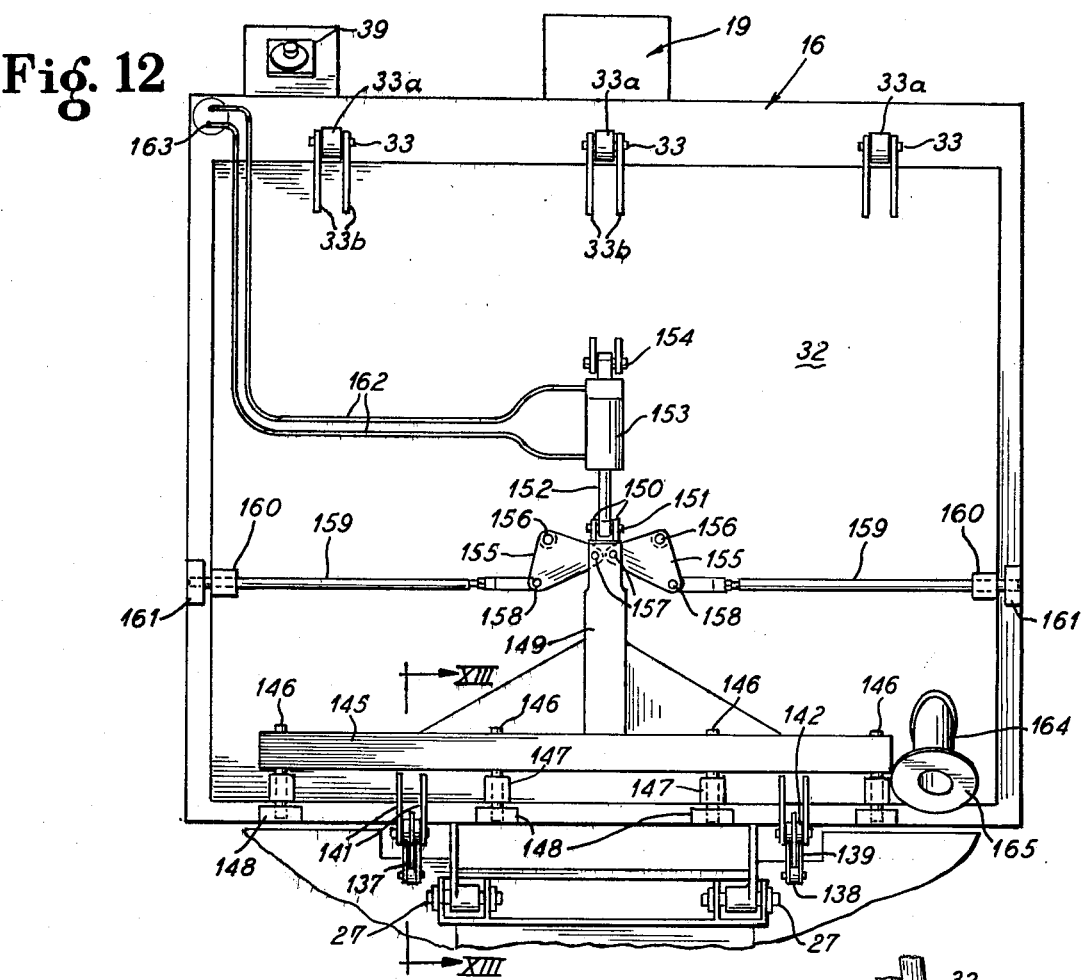
FIG. 12 is a rear elevational view along the line XII—XII of FIG. 2.

The box 16 has an open rear end closed by a tailgate 32 which is pivotally suspended from the top of the box as at 33. As shown in FIG. 12 three such pivots 33 are provided with lugs 33a projecting rearwardly from the top end wall of the box 16 and brackets 33b secured on the outer face of the tailgate 32 embracing the lugs and receiving the pivot pin therethrough.

Figures 5, 6:
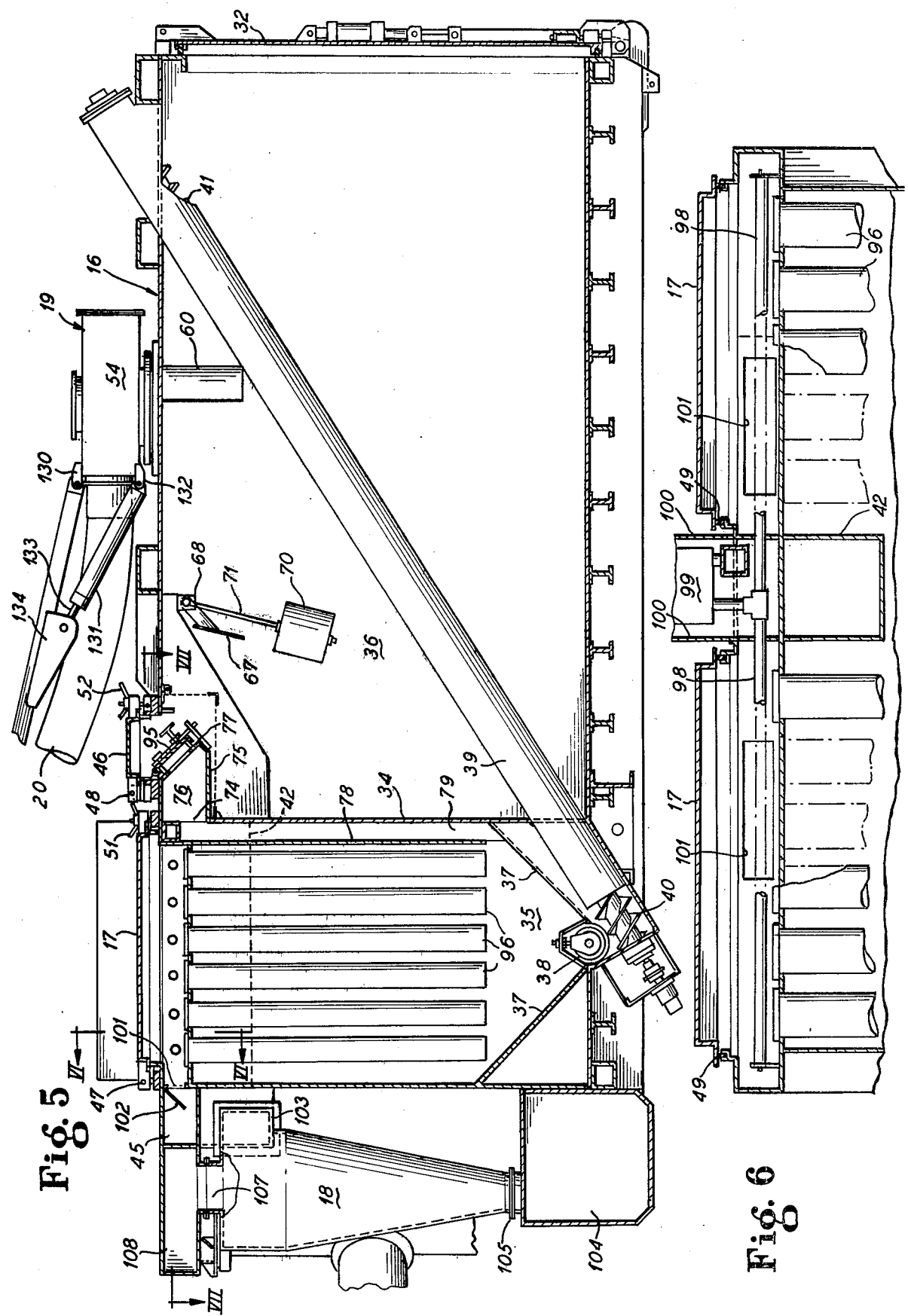
FIG. 5 is an enlarged vertical cross-sectional view with parts in elevation along the line V—V of FIG. 1.
FIG. 6 is a fragmentary vertical section with parts in elevation, along the line VI—VI of FIG. 5.

The front end of the box 16 has a vertical partition wall 34 separating a front bag filter compartment 35 from a much larger material collection main compartment 36 of the box as shown in FIG. 5.

The bottom of the compartment 35 has converging sloping walls 37 which direct material to a transversely extending flight conveyor 38 which discharges into the top of a tube 39 extending from the bottom forward end of the debris box to the top rear end thereof and having a flight conveyor or worm 40 rotatably mounted therein. The top end of the tube 39 has an opening 41 in the bottom face thereof to dump the material lifted by the conveyor 40 from the filter compartment 35 into the top of the debris box as shown in FIG. 5. The tube 39 extends below the bottom of the box at its front bottom end and above the top of the box at its top rear end so that the worm conveyor 40 may be positioned to receive the material from the very bottom of the filter compartment and discharge the material at the very top of the material collecting compartment.

Figure 7:
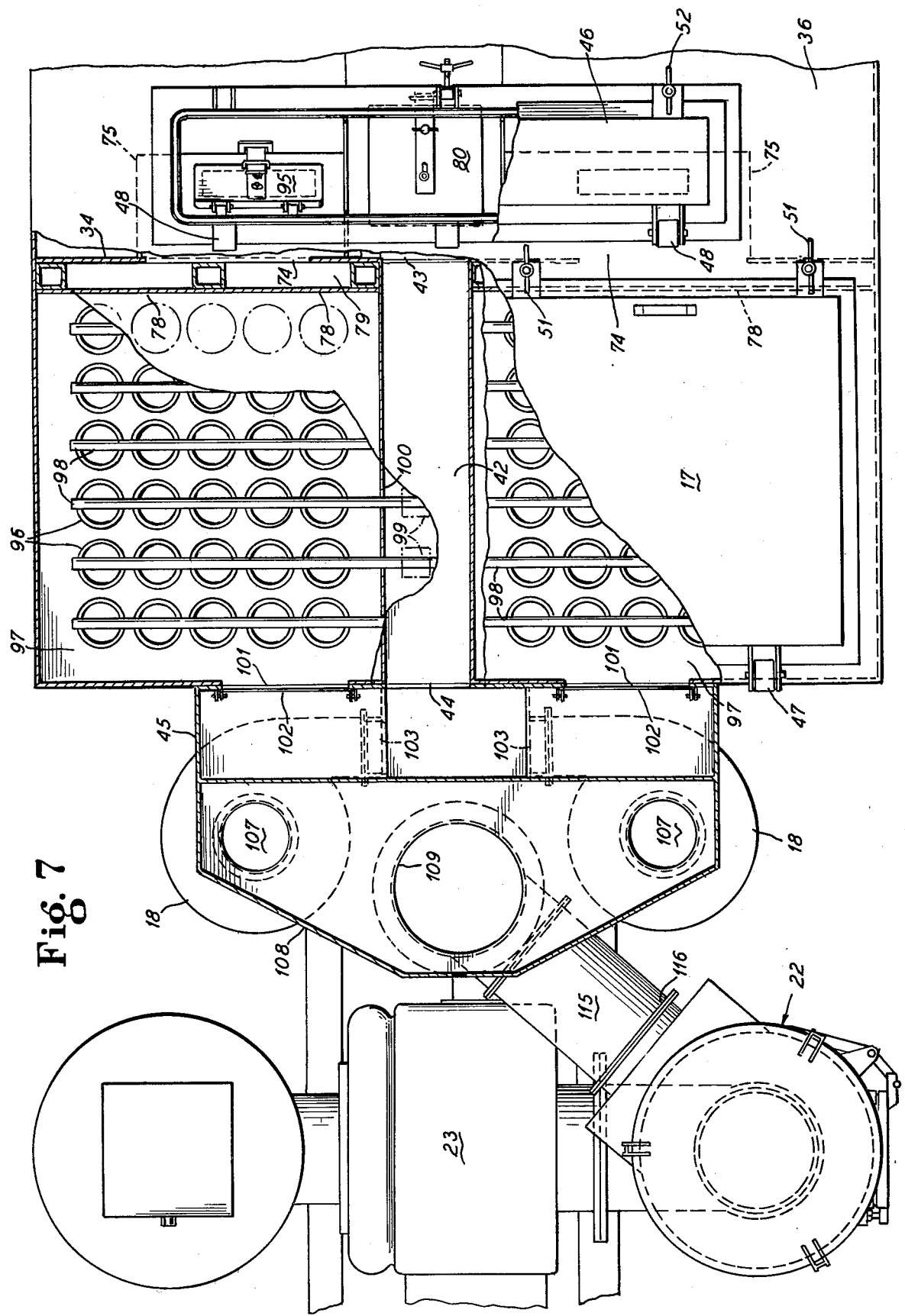
FIG. 7 is a horizontal sectional view with parts in top plan along the line VII—VII of FIG. 5.
Figure 8:
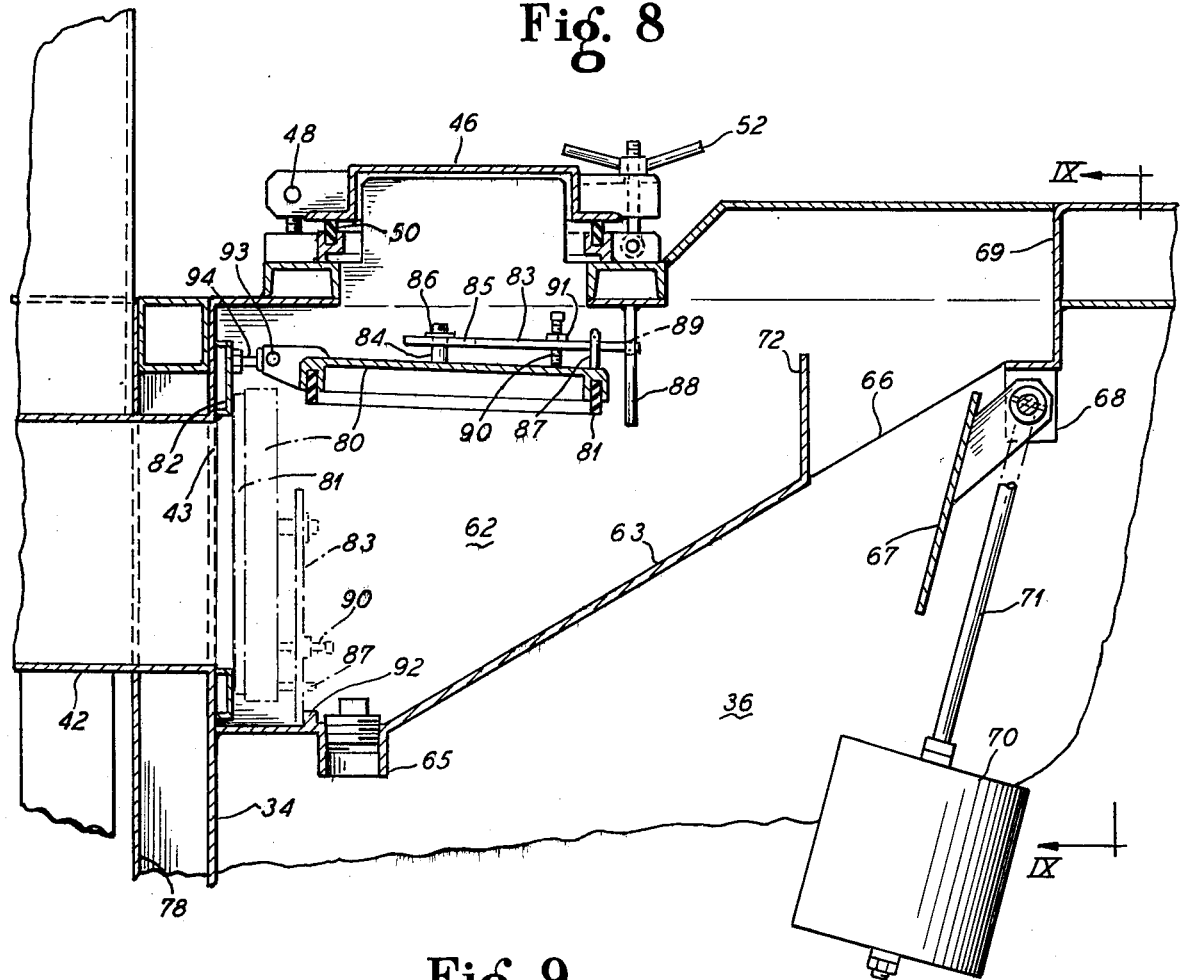
FIG. 8 is an enlarged portion of the section of FIG. 5 taken generally along the line VIII—VIII of FIG. 1.

As shown in FIGS. 6-8, a duct 42 extends under the debris box roof outside of the compartment 35. This duct connects a debris box outlet 43 provided in the partition wall 34 at the top rear end of the debris chamber 36 with an inlet 44 to a manifold duct 45 on the front end of the debris box supplying the tangential inlets of the cyclone separators 18.

Immediately behind the filter bag doors 17,17 on the roof of the debris box 16, there is provided a transverse access door 46 opening to the interior of the debris box.

The doors 17 and 46 are hinged to the roof at their forward ends as at 47 and 48 respectively and are tightened against upstanding peripheral seals 49 and 50 respectively by wing nut and swing bolt assemblies 51 and 52 respectively. The hinge and wing bolt assemblies for the doors 17 and 46 are such that when the wing nuts are tightened the doors will be pressed against their respective peripheral seals 49 and 50 to effectively seal the doors to the debris box 16.

THE AIR FLOW PATH THROUGH THE DEBRIS BOX

Figure 4:
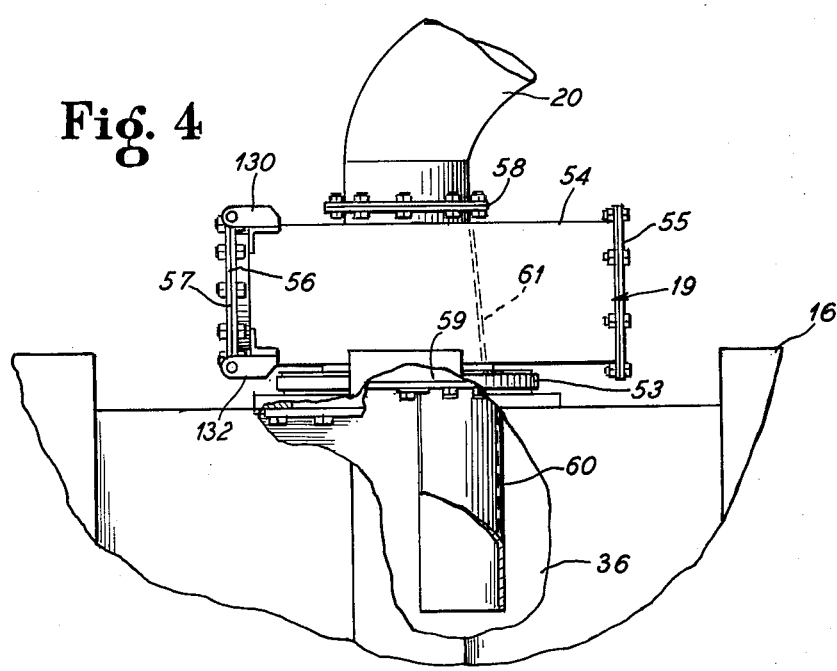
FIG. 4 is an enlarged sectional view with parts in elevation along the line IV—IV of FIG. 1 and showing an upwardly extending debris conduit.

The blower 23 creates a high velocity air stream through the inlet conduit 20 and swivelly mounted inlet 19 on the roof of the box 16. As shown in FIG. 4 the inlet 19 is rotatably mounted on a table 53 and is in the form of a horizontal casing 54 closed at one end by a bolted on plate 55 and at the other end by a plate 56 removably bolted to a flanged neck 57. The plate 56 is easily removed and the pick-up conduit 20 is affixed to the inlet to discharge therein in the position of FIGS. 1 to 3. In FIG. 4, however, the conduit 20 is shown affixed to a flanged top inlet neck 58 on the casing 54. Thus the arrangement is such that the pick-up conduit 20 can be attached either to one end or to the top of the inlet casing 54 to pick up debris located around the vehicle or above the vehicle.

The bottom of the casing 54 is in open communication at 59 with the top of the collection chamber 36 of the debris box 16. An arcuate baffle 60 depends from the casing 54 into the collection chamber 36 with its open side facing the end of the casing receiving the pick-up conduit 20 when the plate 56 is removed. An internal baffle or impact plate 61 is provided in the casing 54 behind the bottom outlet 59 so that debris from the inlet conduit 20 when it is attached to the end of the casing 54 will be directed through the opening 59 and guided by the baffle 60 to the bottom of the collection chamber 36.

The inlet 19 can swivel at least about 300° on top of the debris box 16 so that the inlet conduit 20 can be swung to any desired position around the chassis.

Figure 9:
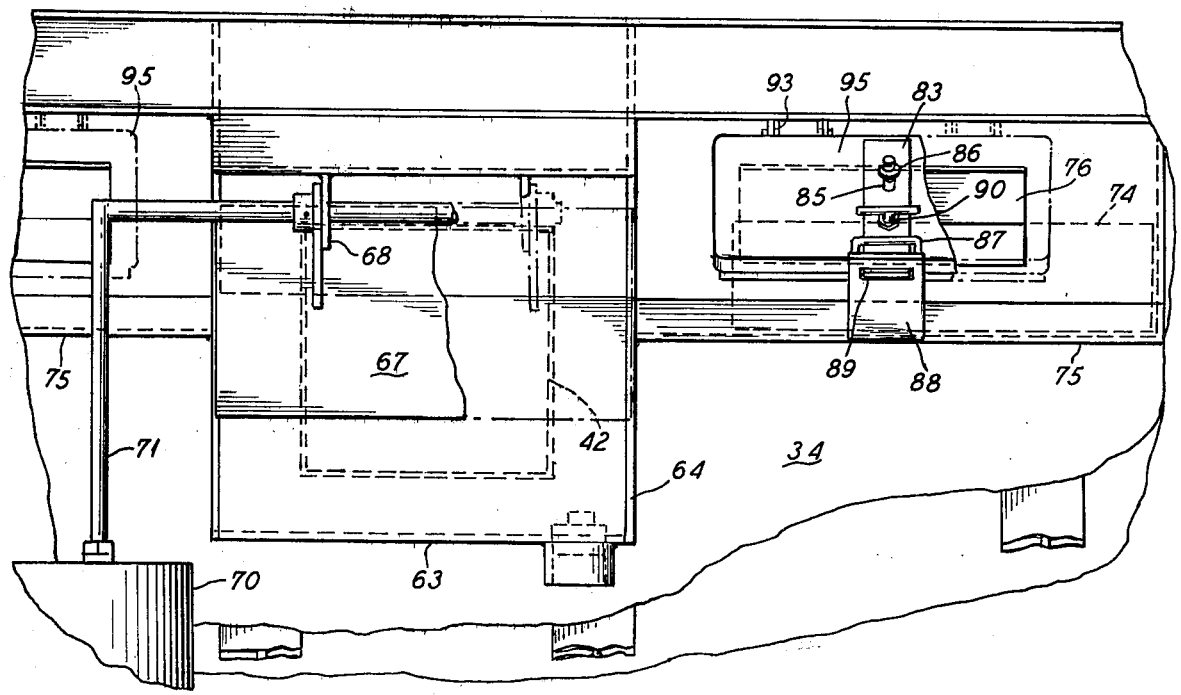
FIG. 9 is a vertical section with parts in elevation taken along the line IX—IX of FIG. 8.

As best shown in FIGS. 5,8 and 9, a compartment 62 is provided in the central portion of the forward top end of the collection chamber 36 in the longitudinal center of the chamber. This compartment is defined by a sloping bottom wall 63 and vertical side walls 64 and has an open top to be accessible from the outside of the debris box 16 through the access door 46.

The bottom 63 slopes from a bottom screw plug closed drain well 65 discharging into the chamber 36 to a top rear opening 66 closed by a float controlled gate 67 hinged on a bracket 68 depending from the bottom wall 63. The rear upper end of the compartment 62 is closed by a vertical wall 69 as shown in FIG. 8.

A float 70 suspended on a rod 71 from the bracket 68 swings the gate 67 to a closed position when the liquid level in the collection chamber 36 reaches a point where the liquid may otherwise spill into the chamber 62. An upstanding wall or baffle 72 on the bottom wall 63 of the compartment 62 provides a dam preventing liquid flow into the forward lower end of the compartment 62 such as by splashing or the like before the gate 67 is closed.

The forward end of the compartment 62 opens to the rear end of the duct 42 mounted on the roof of the debris chamber between the doors 17,17.

As shown in FIGS. 5 and 7 a pair of openings 74 are formed through the top of the partition wall 34. Each of these openings is connected through a duct 75 on each side of the side walls 64 of the central compartment 62 and providing a passageway 76 to an upwardly inclined seat 77. A vertical wall or baffle 78 is mounted in spaced parallel relation in front of the partition wall 34 and depends from the top of the compartment 35 into spaced relation from the sloping bottom 37 thereof to provide passageways 79 from the passageways 76 to the bottom of the chamber 35.

Thus air from the chamber 36 can flow through the ducts 75 on each side of the central compartment 62 through the openings 74 and passageways 79 to the bottom of the compartment 35.

THE FLOW CONTROL GATES

As shown in FIG. 8 a gate 80 is hinged in the compartment 62 to swing from an open horizontal position shown in solid line under the cover or lid 46 to a closed position shown in dotted lines where its peripheral seal 81 is pressed against a rigid seat frame 82 around the duct opening 43.

To suspend the gate 80 in fixed opened position and to lock it in tight sealed closed condition, a strap 83 is mounted in spaced relation from the outer or top face of the gate on a stud 84 projecting through a slot 85 in the strap and having a collar 86 straddling the slot to abut the strap. A lug 87 also projecting from the outer face of the gate 80 adjacent the free or swinging end of the gate has a slot therethrough slidably receiving the strap 83.

A bracket 88 depending from a beam of the debris box has a slot 89 therethrough to receive the free end of the strap 83.

A bolt 90 is threaded through the strap 83 between the stud 84 and lug 87 and is bottomed against the gate to pull the strap 83 tightly against the collar 86 and lug 87 to lock it in fixed position. A lock nut 91 on the bolt prevents unauthorized rotation.

The gate 80 is thus held in fixed opened condition by sliding the strap 83 into the slot 89 of the bracket 88 and by tightening the bolt 90 to lock the strap against movement relative to the gate.

When it is desired to swing the gate 80 to its closed position, the bolt 90 is loosened, the strap withdrawn from the slot 89, the gate dropped to the dotted line position of FIG. 8, the strap retracted to fit over an abutment ledge 92 projecting into the bottom of the compartment 62 and then allowed to drop behind this ledge. The bolt 90 is then tightened and the gate is pressed tightly against the seat frame 82 with the strap 83 pressed tightly against the ledge 92.

The gate hinges such as 93 are carried on adjustable studs such as 94 from the seat frame 82 so that the gate pivots can be drawn towards the seat frame to compress the seal 81 as desired.

Similar gates 95 are provided to open and close the passageways 76 of the ducts 75. These gates 95 have the same seals 81 as the gate 80 to sealingly engage the seats 77 of the ducts 75. These gates also have the same suspension and locking strap construction and hinge construction as the gate 80 and like the gate 80 are easily accessible through the top door or lid 46.

When dry material is being handled the center gate 80 is closed and the side gates 95 are opened to direct the air stream from the chamber 36 to the bottom of the compartment 35.

When wet material is being handled, the gates 95 are closed and the center gate 80 is opened to direct the stream through the duct 42 where it exits at 44 into a manifold 45 feeding the cyclones 18.

THE BAG FILTERS OR SEPARATORS

Bag filters or separators 96 are vertically suspended in the compartment 35 by horizontal plates 97 mounted in the top of the compartment 35 under the doors 17. Two banks of bag filters are thus provided each in communication with a gate 95.

Conventional pulsating back flow air equipment including air tubes 98 overlying the tops of the suspended bags above the plates 97 and valves 99 controlling timed air release through the tubes 98, is provided. The valves 99 can be mounted in a compartment with upstanding side walls 100 between the plates 97 and receiving the tubes 98 therethrough.

The air stream in the compartment 35 is upwardly from under the baffle 78 through the bag filters 96, out of the open tops of the bags above the plates 97 to outlets 101 discharging into the manifold 45. Free swinging dampers 102 overlie these outlets 101 to prevent back flow.

Figure 11:
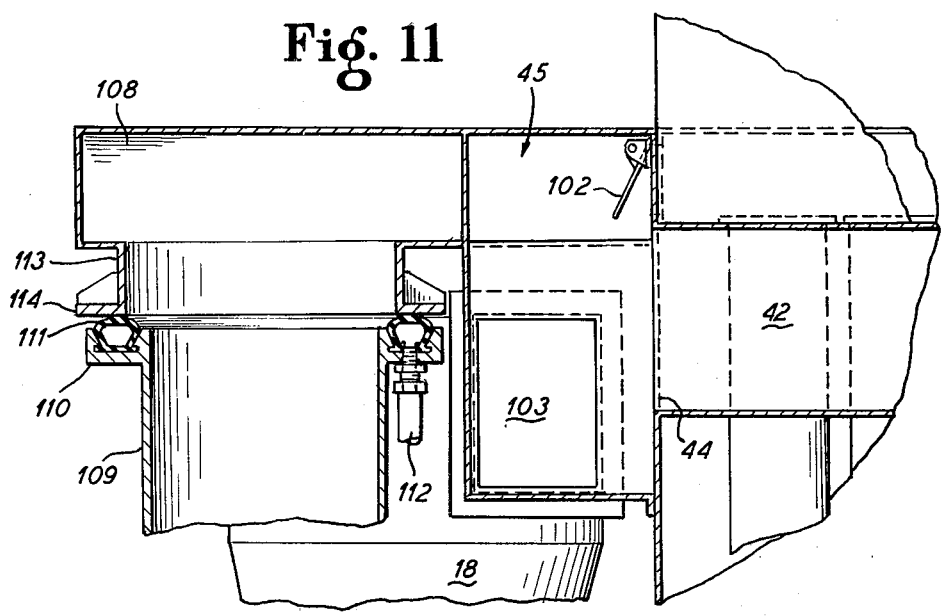
FIG. 11 is an enlarged fragmentary vertical section along the line XI—XI of FIG. 10.

As shown in FIGS. 7 and 11, air from the outlet 44 of the duct 42 and from the outlets 101 of the bag filter compartments above the plates 97 discharges through the manifold 45 into the oppositely opening tangential inlets 103 at the tops of the cyclone separators 18.

THE CYCLONE SEPARATORS

As shown in FIGS. 1 to 3, 5 and 7 a pair of cyclone units 18 are mounted on the front end of the debris box 16 in side by side relation. Each unit 18 is mounted on top of a collection bin, only one of which is shown at 104 secured to the bottom front end of the debris box. Each bin communicates at the top thereof with the solids bottom discharge ends 105 of the cyclones thereabove. Each bin has an access door 106 at the outer end thereof.

Each cyclone 18 has an air outlet 107 at the top thereof discharging into the bottom of a bonnet manifold 108 in front of the manifold 45. The bonnet manifold 108 overlies an upright outlet pipe 109 which is mounted on the chassis between the cyclones 18, 18.

The upper end of this stand pipe 109, as shown in FIG. 11, has a flange 110 receiving an inflatable rubber seal ring 111 which is inflated through an air pipe 112.

The bottom of the bonnet manifold 108 has a depending cylindrical neck 113 with a bottom seat 114 for the seal 111 when it is inflated.

Air from the tops 107 of the cyclones 18,18 thus flows through the bonnet manifold 108 into the top of the stand pipe 109.

THE MICRO-FILTER

The stand pipe 109 is connected midway of its height through a pipe 115 to the inlet 116 of the micro-filter 22. This micro-filter 22 has an upstanding tubular casing 117 with side access doors 118,119 and a removable top lid 120. A cylindrical filter screen 121 seated on a collar 122 in the bottom portion of the casing 117 and clamped into position by the lid 120 receives the air from the inlet 116 therearound. The filtered air flows through the collar 122 to an outlet chamber 123 which has a side opening neck 124 discharging to the inlet of the Roots blower 23.

The cylindrical screen 121 can be changed to vary the micron size of the passageways therethrough thereby controlling the filtering of any remaining dust particles in the air stream to a minimum. The dust collected on the screen falls off the screen and is collected at the bottom of the casing 117 to be removed through the door 119.

THE BLOWER

The Roots blower 23 also mounted on the chassis 11 pulls the filtered air from the bottom of the micro-filter 22 and discharges through the upstanding muffler 24 to the atmosphere at 125.

Figure 10:
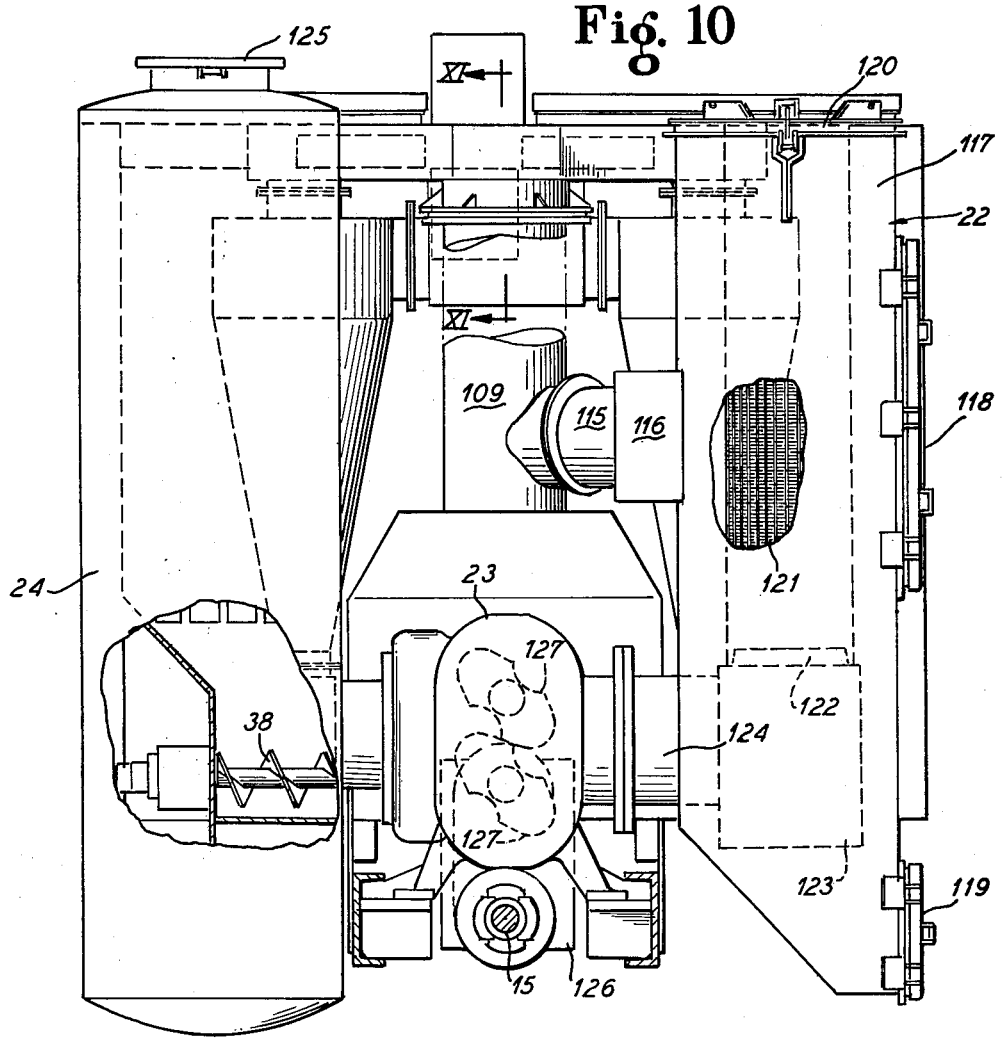
FIG. 10 is a vertical section with parts in elevation taken generally along the line X—X of FIG. 2.

As shown in FIG. 10 the drive shaft 15 from the engine 13 (FIGS. 1 and 2) drives a split shaft transmission 126 which in turn drives the rotors 127 of the Roots blower at desired speeds to develop the high velocity air stream.

THE BOOM

The boom 21 has side arms 128 straddling the portion of the conduit 20 overlying the roof of the debris box. These are pivoted at 129 to lugs 130 on top of the inlet casing 54. The forward ends of the arms 128 are connected by a collar 129a receiving the conduit 20 therethrough and supporting a cage 130a over which the conduit 20 is guided and supported from a horizontal run over the roof of the debris box 16 to a depending run alongside of the vehicle with a free end of the conduit being swingable to a pick-up site.

A pair of hydraulic jacks 131 are pivoted to lugs 132 also on the inlet casing 54 under the arm lugs 130. The piston rod 133 of each jack 131 is pivoted to a bracket 134 depending from the arms 128 forwardly from the pivots 129 thereof.

The boom 21 is thus raised and lowered to carry the inlet conduit 20 at a desired height and swings with the casing 54.

When the conduit 20 is moved to its top attachment position as shown in FIG. 4 the conduit can be used to load the debris box 16 from positions at a considerable height above the roof of the debris box. This eliminates any bends in the conduit. In this manner material to be loaded can be reached from a level substantially above the vehicle.

THE TAILGATE

Figure 13:
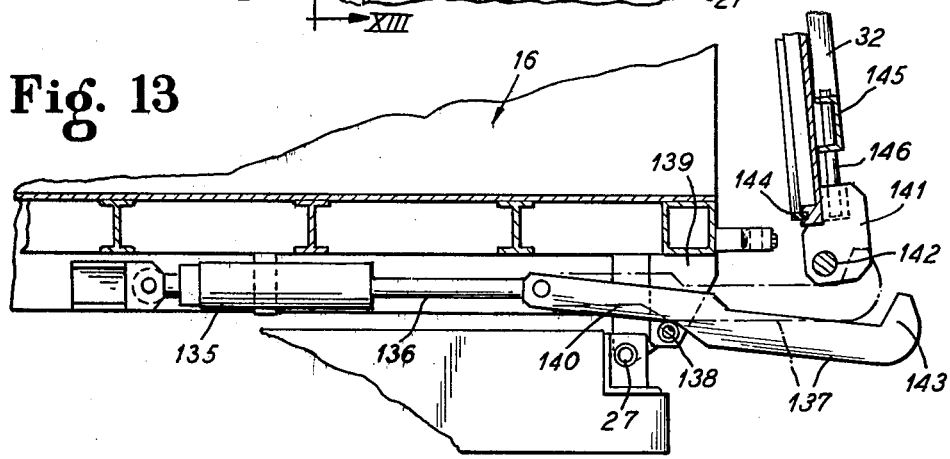
FIG. 13 is a vertical sectional view with parts in elevation taken generally along the line XIII—XIII of FIG. 12.

As shown in FIGS. 12 and 13, the tailgate 32 is latched into sealed position by latching mechanism powered from hydraulic jacks.

A pair of hydraulic jacks 135 are pivotally mounted on the chassis with rearwardly facing piston rods 136 pivoted to draw lugs 137 which ride on pins 138 carried by brackets 139 at the rear end of the chassis. The bottom rear edges of the draw lugs 137 have cam surfaces 140 thereon riding on the pins 138 so that when the piston rods 136 push the lugs 137 rearwardly they will drop to the solid line position of FIG. 13 but when the lugs are pulled forwardly the pins will shift the lugs to the dotted line position of FIG. 13.

The tailgate has depending brackets 141 supporting pins 142 therebetween to be engaged by the hook portion 143 of the draw lugs 137. Thus when the debris box 16 is in horizontal position the tailgate 32 will swing freely to position the pins 142 inwardly from the latched portions 143 of the draw lugs 137 when these draw lugs are in extended position. Then when the draw lugs are pulled forwardly the door will be pulled tightly against the rim of the debris box surrounding the door opening and the seal 144 mounted on the innerface of the tailgate around the peripheral margin thereof will be squeezed tightly into sealing condition.

A transverse bar or beam 145 is slidably suspended on the outer face of the tailgate 32 adjacent the bottom thereof. This beam 145 carries vertical pins 146 at spaced intervals across the length thereof. These pins 146 project into sleeves 147 on the outer face of the bottom of the gate 32 to mount the beam for vertical sliding movement parallel to the outer face of the gate. Directly below these sleeves 147, on the bottom marginal end of the debris box 16 there are provided apertured lugs 148 receiving the pins 146 when the beam 145 is lowered. When the beam 145 is raised the pins are retracted from these lugs 148 into the sleeves 147 but they are never raised above the sleeves so that the beam is always slidably guided in the sleeves 147.

A central upstanding post 149 rises from the beam 145 in fixed rigid relation therewith to a top pair of lugs 150 which are pivotally pinned at 151 to the piston rod 152 of a hydraulic cylinder 153 pivoted at 154 on the outer face of the gate 32.

Toggle plates 155 are pivoted at 156 to the gate 32 on each side of the post 149 and are pinned at their inner corners, at 157 to the post and at their outer corners 158 to rods 159 which are slidably mounted on the outer face of the gate 32 and passed through bearings 160 on the gate to project into retainers or lugs 161 on the rear end of the debris box.

Flexible hoses 162 extend from a pressured hydraulic fluid terminal 163 on the debris box to the jack cylinder 153 to raise and lower the piston in the jack thereby extending and retracting the piston rod for locking and unlocking the tailgate in its sealed closed condition.

When the vehicle is driven to a dump site the piston rod 152 is raised to move the rods 159 out of the retainers 161 and to move the pins 146 out of the retainers 148. The cylinders 135 are then actuated to extend the piston rods 136 pushing the lugs 137 thereby dropping them to the solid line position of FIG. 13 whereupon the gate is free to swing open for discharging the collection chamber.

The gate is then drawn into sealed engagement with the rear end of the debris box by retracting the piston rods 136 in the cylinders 135 thereby causing the hook ends 143 to engage the pins 142 and draw the pins 146 on the beam 145 into alignment with the retainers 148 whereupon the cylinder 153 is actuated to extend the piston rod 152 lowering the pins 146 into the retainers 148 and extending the rods 159 into the retainers 161.

THE LIQUID DRAIN

The tailgate 32 has a drain pipe 164 projecting rearwardly and downwardly from the bottom right-hand corner as viewed in FIG. 12. This drain tube has a flange 165 on the outer bottom end thereof receiving a flexible hose 166 thereover as shown in FIG. 3. This hose when not in use is folded over the tube 165 and retained by a hook 167 on the gate thereby bending the hose over the flange. A butterfly valve in the tube 164 seals the box from the hose 166. When it is desired to drain liquid out of the collection chamber 36 the hose is dropped to a drain position, the valve is opened, and water may drain through the hose.

THE POWER TRAIN

Figure 14:
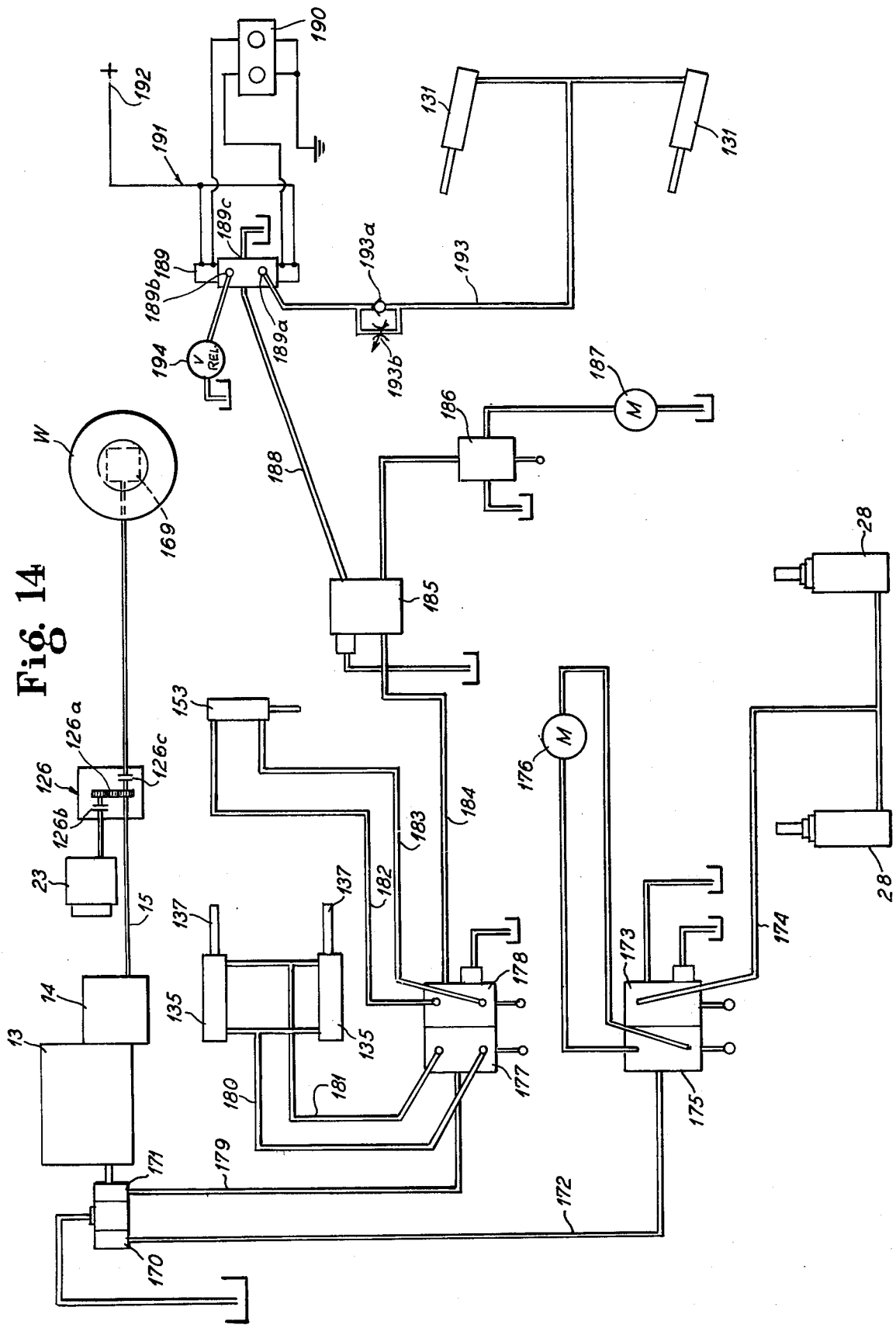
FIG. 14 is a power drive and flow diagram of the components of the loader.

As shown in FIG. 14, the engine 13 drives the drive shaft 15 through a transmission 14 and the split shaft transmission unit 126. The unit 126 has a gear train 126a driving the blower 23. Disconnect clutches 126b and 126c controlled by the driver of the vehicle selectively direct power to the blower 23 or to the rear wheels W through a conventional rear axle 169. The blower can be driven simultaneously with the rear wheels as when picking up material along a roadway.

The engine 13 also drives a pair of hydraulic pumps 170 and 171 supplying hydraulic fluid in two separate circuits to all of the hydraulic units on the vehicle.

Thus the hydraulic jacks 28 for lifting the debris box 16 receive fluid from the pump 170 through a conduit 172. A valve 173 then controls the fluid flow into and out of a conduit 174 to the bottoms of the jack cylinders 28 for raising the debris box 16. When fluid is relieved from the tube 174 by the valve 173, the weight of the debris box will collapse the cylinders of the jacks back into telescoped relation.

A valve 175 receiving fluid from the pump 170 through conduit 172 controls the fluid flow through a hydraulic motor 176 which drives the conveyor worm or auger 40 to lift solids from the bottom walls 37 of the filter compartment 35 to the top of the debris box 16.

Control valves 177 and 178 receive fluid from the pump 171 through conduit 179. The valve 177 then controls the fluid flow through conduits 180 and 181 to operate the door closing jacks 135. A valve 178 controls flow from the conduit 179 through conduits 182 and 183 to control the door lock jack 153.

When the valves 177 and 178 are in position to secure the jacks 135 and 153 in their fixed positions for sealing the tailgate 32 in its closed sealed position, fluid from the supply conduit 179 is free to flow through conduit 184 to a flow divider 185 from which part of the flow is directed to a valve 186 controlling a hydraulic motor 187 which operates the cross worm or auger 38 at the bottom of the bottom walls 37 of the filter compartment 35 to feed the lifting auger or worm 40.

Part of the fluid from the flow divider 185 flows through conduit 188 to a solenoid operated valve 189 controlled by a two button switch 190. A circuit 191 energized from a source 192 on the vehicle energizes the solenoid valve 189 under the control of the switch 190 to flow fluid from conduit 188 selectively to operating ports 189a and 189b and a drain port 189c. Port 189a supplies fluid through conduit 193 to the boom control cylinders 131. A check valve 193a with an adjustable needle valve 193b in the conduit 193 prevents a free fall of the boom 21. A relief valve 194 maintains a working pressure for the system. The arrangement is such that the push buttons 190 are manipulated to raise and lower the boom as desired with the lowering operation including a relatively slow fluid flow thereby preventing a free fall of the boom. The solenoid valve 189 has a closed position locking fluid in the boom cylinders 131 to hold the boom in its selected elevated position.

THE CHECK PANEL

As shown in FIG. 15 the instrument panel 25 on the chassis contains instruments 26 indicating the operating conditions of the blower 23, the micro-filter 22 and the bag filters 96. Thus a temperature gauge 195 on the panel 25 indicates the operating and discharge temperature of the blower 23, a pressure differential switch 196 operates a warning light 197 to indicate clogging of the bag filter 96. A vacuum gauge 198 indicates operating pressure of the system. A pressure differential gauge 199 is selectively energized through valves 200 and 201 to indicate pressure differentials between the blower 23 and the inlet side of the bag housing, between the blower 23 and the inlet side of the micro-filter 22, and across the inlet and outlet sides of the bag housing. These gauges give the operator a quick visual check of the operating conditions of the system.

A float 202 (FIG. 2) in the debris box 16 swings an external pointer 203 on the side of the box to show the level of the collected material in the debris box.

SUMMARY

From the above descriptions it will be understood that this invention provides a mobile vehicle with all of the equipment desired for quickly loading either wet or dry material at a pick-up site, transporting the loaded material to a dump site and manipulated at both sites with little man power making it possible for a single operator to control the entire operations at both sites as well as driving the vehicle between the sites. The loader operates on a high velocity air sweep principle, positioning the inlet of a pick-up conduit relative to the vehicle so as to readily receive the material to be loaded and sweeping the material with air also rushing through the inlet into the top of a large loading chamber where the picked up material drops to the bottom of the chamber and the air exits selectively as controlled by gates accessible from outside of the container to be filtered by bag filters, cyclone separators, and a micro-filter in succession when the exiting air is only laden with dry particles or to flow only through the cyclone separator and micro-filter when the air laden materials are wet. The pick-up container has a tailgate sealed against leakage during the pick-up operation and swung to an open position when the container is elevated to discharge the picked up materials.

The bag filters and cyclone separators are fixed integral parts of the pick-up container, moving therewith, while the micro-filter and the blower are fixed on the chassis of the vehicle and are automatically placed in sealed communicating relation with the movable filters and separators when the loader is in operating position.

It should be understood that the micro-filter may be dispensed with in some usages for the loader with the air outlets of the cyclone separators discharging directly to the blower.

I claim as my invention:

1. A mobile vacuum loader comprising a vehicle having a prime mover, a closed container on said vehicle, a pick-up conduit on said container adapted to deliver material to the container, a plurality of different separators in series relation selectively communicating with said container, a blower fixed on said vehicle having an inlet pulling air through said pick-up conduit, said container, and said separators, means on said vehicle driving said blower from said prime mover, gates in the container, doors on the container adjacent said gates providing access to said gates from outside said container, said gates selectively controlling air flow from the container through one or more of said separators while by-passing the remaining separators, hydraulic pump means on said vehicle driven by said prime mover, a hydraulically actuated boom means supporting said pick-up conduit and actuated by hydraulic fluid from said pump means, a dump gate mounted on said container having a closed position sealing the container and an open position for discharge of material from the container, hydraulically actuated means driven by said pump means controlling the sealing and opening of said dump gate on said container, means for moving said container to a dumping position so as to dump material from said container through said dump gate actuated by hydraulic fluid from said pump means, hydraulically driven conveyor means on said container having an inlet receiving filtered material from a separator and an outlet discharging the filtered material into the container for moving filtered material from the separator back to the container, and a separable coupling disposed between the inlet of said blower and said separators and accommodating movement of the container to the dumping position.

2. The loader of claim 1 wherein said container is tiltably mounted on said vehicle and said means for moving said container to a dumping position is a hydraulic jack means.

3. The loader of claim 1 wherein the plurality of different separators include a bag filter, and a cyclone separator in series therewith and the gates accessible from outside said container direct air flow through said bag and cyclone separators in series or through said cyclone separator alone.

4. The vacuum loader of claim 1 including an upstanding micro-filter on said vehicle receiving air from said plurality of different separators to further filter the air before discharge to the atmosphere.

5. The vacuum loader of claim 1 wherein the hydraulic pump means includes two pumps with separate hydraulic circuits controlling all of said hydraulically actuated and driven means.

6. A vacuum cleaner which comprises a wheeled vehicle chassis, an engine driving the vehicle wheels, means on said chassis driven by said engine, a blower driven by said means on said chassis, hydraulic pump means driven by said engine, a debris box tiltably mounted on said chassis having front and rear ends, a top and a bottom, a tailgate swingably mounted on the rear end of the debris box, a pick-up conduit swivelly mounted on top of the debris box for depositing picked-up material therein, a bag filter housing mounted on the front end of the debris box and having a bottom, bag filters in said housing, a conveyor communicating with the bottom of the filter housing and with the top of the debrix box for returning filtered solid material from the bags to the debris box, cyclone separator means mounted on the debris box in front of said bag filter housing, said cyclone separator means having a tangential inlet communicating with said bag filter housing, an air outlet, and a solids outlet, a micro-filter on said chassis communicating with said air outlet of said cyclone separator means, said blower on said chassis pulling air through said micro-filter, the cyclone separator means, the bag filter housing and bag filters therein, the debris box, and the pick-up conduit, separable coupling means joining the air outlet of the cyclone separator means with the micro-filter, hydraulic means actuated by said hydraulic pump means latching and sealing said tailgate to said debrix box, raising and lowering said pick-up conduit relative to said debris box, tilting the debris box on the chassis to dump material collected therein and driving said conveyor for returning solid filtered material from the bottom of the bag filter housing to the debris box, and gates in the debris box accessible from the top of the debris box selectively directing air flow therefrom successively through the bag filters and the cyclone separator means or through the cyclone separator means alone en route to said micro-filter.

7. The vacuum cleaner of claim 6 wherein the bag filter housing has a pair of access doors on top of the debris box, and an additional door rearwardly of said access doors on top of the debris box provides access to said gates.

8. The vacuum cleaner of claim 6 including a float controlled gate in said debris box preventing liquid flow to the gate for said bag filter housing.

9. The vacuum cleaner of claim 6 wherein the swivelly mounted pick-up conduit has an end conduit attachment and a top conduit attachment to accommodate mounting the pickup conduit for picking up material around the vehicle and above the vehicle.

10. The vacuum cleaner of claim 6 including a bonnet mounted on the front end of the debris box providing an air manifold receiving the air stream from the bag filter housing or directly from the debris box to the cyclone separator means.

11. The vacuum cleaner of claim 6 including a stand pipe on said vehicle chassis receiving air from said cyclone separator means and wherein the separable coupling means is at the bottom thereof communicating with the micro-filter.

12. An industrial vacuum cleaner having a materials collection container with a front end and a top and having an outlet adjacent the top, a pick-up conduit discharging into the container, a plurality of particulate material removing separator units communicating in series with the outlet of the container, a blower pulling air through said separator units, said container and said pick-up conduit, gates in the container, doors on the container adjacent said gates providing access to said gates from the outside of said container, and said gates selectively controlling air flow through all of said separator units or to by-pass a unit.

13. The vacuum cleaner of claim 12 wherein the plurality of particulate material removing separator units include a bag filter and a cyclone separator, means connecting said bag filter and separator in series and a duct directly connecting the outlet of the collection container with the cyclone separator without passing air through the bag filter.

14. The vacuum cleaner of claim 12 wherein the plurality of particulate material removing separator units include a bag filter, a cyclone separator, and a micro-filter in series with a duct directly joining the outlet of the collection container with the cyclone separator under control of said gates accessible from the outside of the container.

15. The vacuum cleaner of claim 12 wherein said doors overlie said gates in the container which selectively control the air flow through all separator units or to by-pass a unit.

16. The vacuum cleaner of claim 12 wherein one of the separator units is a bag filter mounted in a compartment of the collection container and another separator unit is an upstanding cyclone separator mounted on the front end of the collection container.

17. The vacuum cleaner of claim 12 wherein one of the separator units is a bag filter mounted in a front end compartment of the collection container, another of the separator units is an upstanding cyclone separator mounted on the front end of the collection container, said bag filter and said cyclone separator each having an inlet and an outlet, a manifold mounted on the front end of the collection container provides a connection between each of the outlets of the bag filter and the collection container with the inlet of the cyclone separator, and damper means closing the outlet of the bag filter when the gates by-pass the bag filter and directly connect the collection container with the manifold.

18. An industrial vacuum cleaner which comprises a truck chassis, a debris box on said chassis having a collection chamber, a roof on top of said debris box, a front end, and a rear end, a pick-up conduit discharging into the collection chamber through the roof of the debris box, a bag housing communicating with the top of the debris box, bag filters in said housing, cyclone separator means having an inlet communicating with the top of the debris box and with the bag filters, a blower on the truck chassis pulling air through the pick-up conduit, the debris box, the bag filters, and the cyclone separator means, gates in said debris box, doors on the roof of the debris box adjacent said gates providing access to said gates from outside of the debris box, and said gates selectively controlling air flow through said bag filters and said cyclone separator means in series or directly from the debris box to the cyclone separator means.

19. The vacuum cleaner of claim 18 including a duct means directly connecting the debris box with the inlet of the cyclone separator means and having an inner end opening to the debris box and wherein the gate controlling air flow from the debris box to the separator means is on said inner end of said duct means.

20. The vacuum cleaner of claim 18 including two sets of bag filters in said bag housing in side by side relation with each set in communication with the debris box and a door and gate for each set of bag filters.

21. The vacuum cleaner of claim 18 including two sets of bag filters in said bag housing in side by side relation, a gate controlling air flow to each set of bag filters, and another gate controlling air flow directly from the debris box to the inlet of the cyclone separator means.

22. The vacuum cleaner of claim 21 wherein said gates are aligned transversely across the top of the collection chamber.

23. The vacuum cleaner of claim 22 including seal means for said doors and means for clamping said doors tightly against said seal means to prevent leakage into the debris box.

24. The vacuum cleaner of claim 18 wherein the debris box is tiltably mounted on said chassis, has a swingable tailgate on the rear end thereof, and hydraulic means lift the debris box to a dumping position.

25. The vacuum cleaner of claim 18 including a rotatable inlet mounting on top of said debris box having an end coupling and a top coupling for the pick-up conduit.

26. The vacuum cleaner of claim 25 wherein the rotatable inlet mounting has a depending baffle projecting into the debris box to direct picked up materials received from the conduit to the bottom of the debris box.

27. The vacuum cleaner of claim 18 having a rotatable inlet mounting on the roof of the debris box for said pick-up conduit, a conduit supporting boom pivoted on the rotatable inlet mounting and hydraulic jack means raising and lowering said boom.

28. A vacuum loader adapted to pick up either dry or wet solids materials, convey the same to a dump site, and protect the environment against pollution from particulate matter which comprises a vehicle adapted to be driven to pick up and dump sites, a tiltable sealed dump body on said vehicle having a forward end and a rearward end, a rearwardly opening dump gate at the rearward end of said body, and a pick-up conduit communicating with the top of said body to deposit either dry or wet materials therein, a partition in said body providing a bag filter housing at the forward end of said body, and a materials collection portion at the rearward end of said body, cyclone separator means mounted upright on the forward end of said body outside said body, a blower on said vehicle having an inlet pulling an air stream through said pick-up conduit, said body, said bag filter housing, and said cyclone separator means, bag filters suspended in said bag filter housing, said cyclone separator means having a tangential inlet selectively receiving air directly from said body or from said bag filters gates in the body, doors on said body adjacent said gates providing access to said gates from outside of said body, and said gates controlling air flow through both the bag filters and the cyclone separator means when dry material is being picked up or directly to the cyclone separator means when wet material is being picked up whereby said bag filters are protected against clogging by wet particulate matter.

29. The vacuum loader of claim 28 wherein said doors are in side by side relation at the forward end of the top of the materials collection portion of the dump body and overlie the gates to provide ready access thereto.

30. The vacuum loader of claim 29 wherein the gates have latching means securing them in opened or closed position.

31. The vacuum loader of claim 30 wherein the latching means includes slidable straps on the gates.

32. The vacuum loader of claim 28 including a float control gate in the top forward end of the materials collection portion of the dump body preventing overflow of liquid into the cyclone separator means.

33. The vacuum loader of claim 28 including hydraulic mechanisms for latching and sealing the dump gate.

34. The vacuum loader of claim 28 including a microfilter having an inlet communicating with the cyclone separator means, and a filtered air outlet communicating with the inlet of the blower.

35. The method of loading material from a pick-up site, conveying the material to a dump site, dumping the material at the dump site, and protecting the environment from particulate matter which comprises flowing a high velocity air stream through a pick-up conduit to sweep either wet or dry material through the conduit, collecting the picked up material in a sealed chamber, directing the high velocity air stream selectively from said chamber through bag filters and cyclone separator means in series when dry material is being picked up, shifting the air stream from the chamber directly to said cyclone separator means when wet material is being picked up, controlling said directing and shifting with sealed gates disposed within said chamber, providing access to said gates from outside said chamber through sealed lids, discharging clean air to the atmosphere freed from particulate matter, conveying the collected material in said chamber to a dump site, and discharging the picked up materials from the chamber at the dump site.

36. The method of claim 35 including the step of stopping overflow of liquid into the cyclone separator means.

37. The method of claim 35 including the step of draining liquid from the sealed chamber prior to discharging the picked up materials.

* * * * *